United States Patent [19]

Fujino

[11] 4,333,689
[45] Jun. 8, 1982

[54] CONNECTION DEVICE FOR SPACED ELECTRIC COMPONENTS

[75] Inventor: Hitoshi Fujino, Furukawa, Japan

[73] Assignee: Alps Electric Co., Ltd., Tokyo, Japan

[21] Appl. No.: 190,023

[22] Filed: Sep. 23, 1980

Related U.S. Application Data

[63] Continuation of Ser. No. 970,642, Dec. 18, 1978, abandoned.

[30] Foreign Application Priority Data

Dec. 16, 1977 [JP] Japan .................. 52/169120

[51] Int. Cl.³ .................. F16C 29/00; H01H 3/00; H01H 3/12
[52] U.S. Cl. .................. 308/3 R; 74/503; 200/18; 200/331
[58] Field of Search .............. 308/3 R, 3 A, 3 B, 3.6; 339/9 R; 200/18, 331; 74/503, 531

[56] References Cited

U.S. PATENT DOCUMENTS

| | | | |
|---|---|---|---|
| 2,759,773 | 8/1956 | Wilmer et al. | 308/3.6 |
| 3,126,757 | 3/1964 | Cadwallader | 308/3 R X |
| 3,360,306 | 12/1967 | Vargady | 308/3 R |
| 3,422,720 | 1/1969 | Johnson | 308/3 R X |
| 3,477,770 | 11/1969 | Niemi | 308/3.6 |
| 3,981,553 | 9/1976 | Gutner | 308/3.6 X |
| 4,060,291 | 11/1977 | Seybold | 308/3 R X |
| 4,121,063 | 10/1978 | Aimi | 200/18 |

FOREIGN PATENT DOCUMENTS 51-65258 5/1976 Japan .

*Primary Examiner*—Stuart S. Levy
*Attorney, Agent, or Firm*—Guy W. Shoup; Gerard F. Dunne

[57] ABSTRACT

A connection device for spaced electric components comprises a guide member made of a flat resilient tubular member having a plurality of windows and bridge portions alternating on the major surfaces of the tubular member, or alternatively, a guide member made up of a plurality of guide elements having bridge portions on opposite surfaces between the longitudinal edge portions. A slide member made of a resilient material is introduced through the guide member. Projections are formed on the inner surfaces of said bridge portions of the guide member and escape portions are formed between end portions of said projections to allow the slide member to be moved easily within the guide member.

5 Claims, 13 Drawing Figures

FIG.3 (A) PRIOR ART

FIG.5 (A-1) 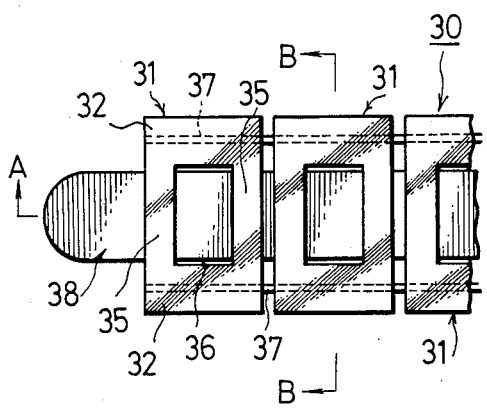
FIG.5 (A-2) 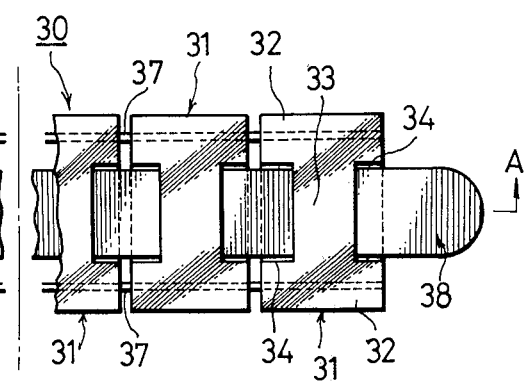

CONNECTION DEVICE FOR SPACED ELECTRIC COMPONENTS

This application is a continuation of copending application Ser. No. 970,642 filed Dec. 18, 1978 and now abandoned.

BACKGROUND OF THE INVENTION

Field of the Invention

The present invention relates to connection devices for interconnecting spaced electric components whereby one component may be operated remotely by actuation of the other.

Such devices for operating one electric component remotely by actuating a second electric component are known. One type of such device recently developed, shown in FIG. 1 and generally identified by reference numeral 39, interconnects an operation component 40 having a push button actuator and a switch component 41. The switch component 41 may be located within a chassis and the operation component 40 secured to a panel of the chassis. The connection device includes a slide member movable by actuation of the push button actuator to operate a sliding switch contact connected indirectly to the inner end of the slide member.

Such connection devices are generally constructed, as shown in FIG. 2, by inserting the slide member 5, typically made of a resilient synthetic resin, through a guide member 1 often made of a resilient synthetic resin and having a generally flat tubular shape. The opposing major surfaces of the guide member each have a plurality of windows 3 and bridge portions 4 formed between the longitudinal edge portions 2, or alternatively, the guide member may be constructed as shown in FIG. 3 by inserting a slide member 17 through a guide member 10 formed by a plurality of guide elements 11 interconnected by resilient metal wires 16 extending through the edge portions 12 on the respective sides of the guide elements 11. The guide elements 11 are shaped so as to generally correspond to the sections taken alone line C—C' and line D—D' of FIG. 2A. Put differently, each guide element 11 includes a window 13 flanked by bridge portions 15 and a recessed portion 14 opening laterally. A further alternative device is shown in FIG. 4, wherein a slide member 25 made from a resilient metal plate extends through a guide member 21 formed by pressing a resilient metal strap to push out the surfaces between the edge portions 22 to form a plurality of windows 23 and bridge portions 24. In each of these devices, the bridge portions on one side of the guide member alternate with those on the other.

Irrespective of whether they were made from a synthetic resin material or metal plates, however, the slide members are often formed by cutting a wide plate to a predetermined width by means of a slitter, often giving rise to the development of burrs on the cut surfaces. Therefore, when the slide members were inserted or slid in guide members having bridge portions and windows or recessed portions, any burrs on either edges of the slide member tended to be caught by the edges of the bridge portions of the guide member, particularly if the device did not follow a straight line path between the electric components. Consequently, the slide member could not often be slid smoothly, and the operation tended to require more than the desired force.

SUMMARY OF THE INVENTION

In view of the abovementioned, therefore, the object of the present invention is to provide a connection device for spaced electric components having an improved construction and which is free of the abovementioned defects.

BRIEF DESCRIPTION OF THE DRAWINGS

FIGS. 1 to 4 show recently developed connection devices, in which:

FIG. 1 shows a connection device in use, with portions broken away;

FIG. 2 shows one example, in which diagram (A) is a plan view, diagram (B) is a cross-sectional view along line A—A' of diagram (A), and diagram (C) is a cross-sectional view along line B—B' of diagram (A);

FIG. 3 shows another example, in which diagram (A) is a perspective view showing important portions, and diagram (B) is a cross-sectional view along line A—A' of diagram (A);

FIG. 4 is a perspective view showing still another example in a disassembled manner;

DESCRIPTION OF THE PREFERRED EMBODIMENTS

Figure 1:
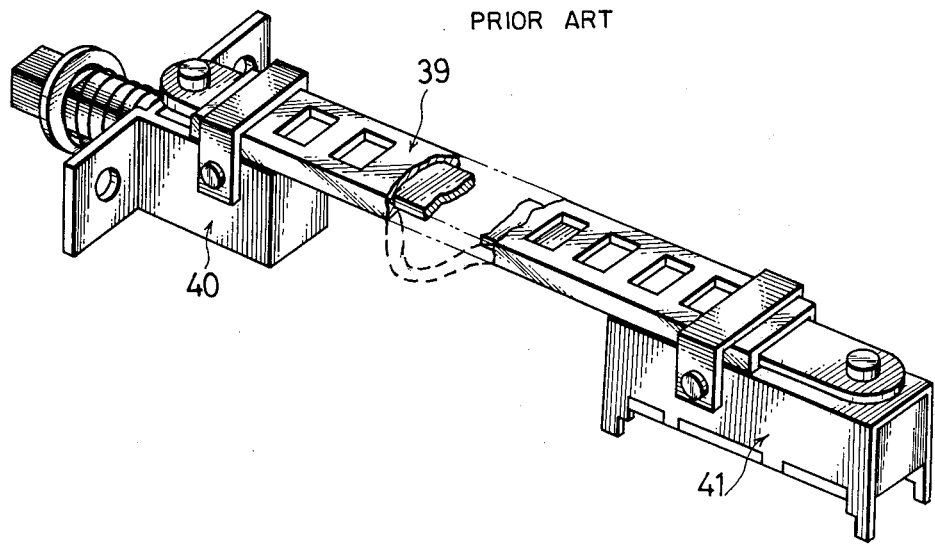
Figure 2:
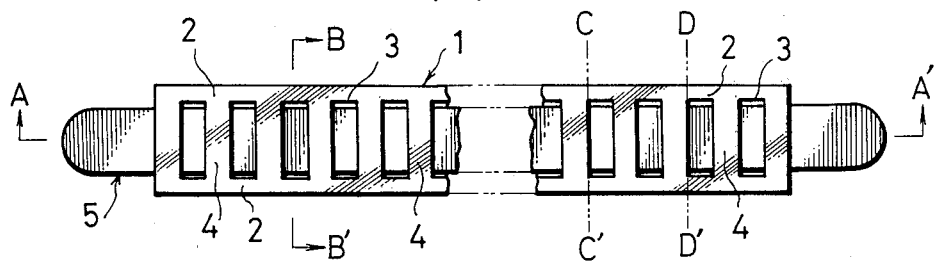
Figure 2:
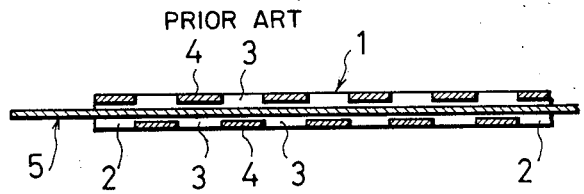
Figure 2:
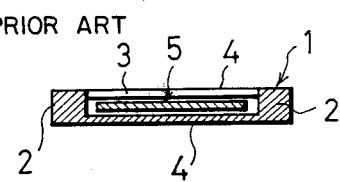
Figure 3B:
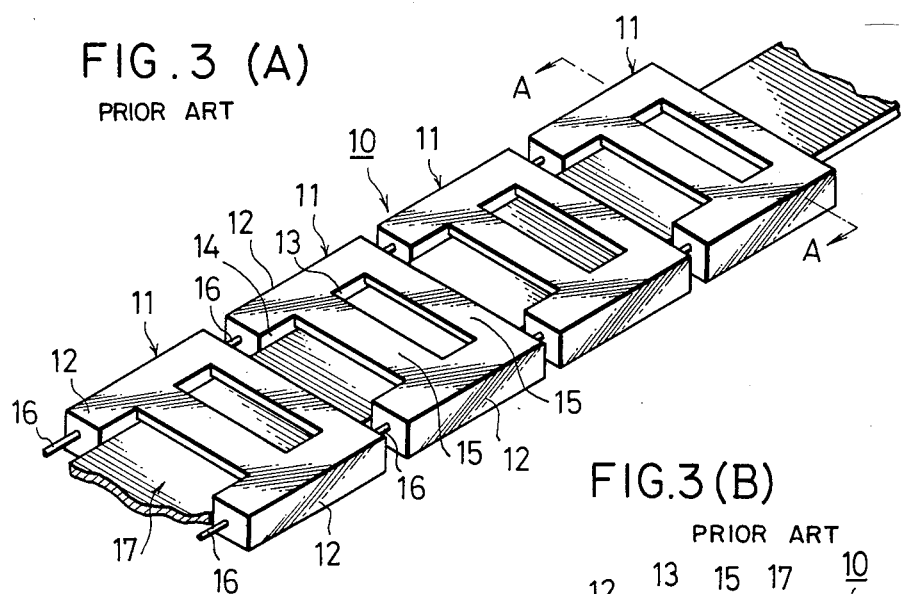
Figure 3B:
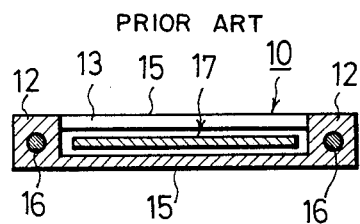

A first embodiment of the present invention is illustrated with reference to FIG. 5, in which reference numeral 30 represents a guide member formed by connecting a plurality of guide elements 31 each made of a resilient synthetic resin. A suitable distance is maintained between adjacent guide elements 31 by resilient metal wires 37 inserted through respective edge portions 32 on each side of the guide elements. The guide elements 31 are shown from the top in the left hand portion of FIG. 5, i.e. FIG. 5(A-1); and viewed from the bottom in the right hand portion of FIG. 5, i.e. FIG. 5(A-2). Each guide element 31 is provided with a central bridge portion 33 and two recessed portions 34 on the lower side thereof, and lateral bridge portions 35, and a central window 36 therebetween on the upper side. On the inner surface of the central bridge portion 33 is formed a projection 33a extending inwardly and having an arcuate inner surface. The projection 33a extends along the length of the central bridge portion 33, but ends short of the lateral edge portions of the guide element. In this way, escape portions 33b and 33b are formed between ends of the projection 33a and the respective edge portions 32 on each side of the guide elements. Consequently, any burr on the longitudinal edge of the slide member 38 can pass easily through the escape portions 33b.

The lateral bridge portions 35 each have a shape corresponding to one half of a central bridge portion which has been divided longitudinally. The lateral bridge portions 35 thus have projections 35a having an arcuate surface, so that, any burr formed on the slide member may pass through an escape portion in the same way as mentioned above. The lateral bridge portions 35 of neighbouring guide elements 31, if brought into contact together, acquire nearly the same shape as the central bridge portions 33. The slide member 38 is made of a resilient synthetic resin plate and has a length greater than the guide member 30. The slide member also has a width slightly smaller than the distance between the inner sides of the edge portions of the guide member 30, and has a thickness slightly smaller than the clearance A shown in the diagram (B) of FIG. 5.

As mentioned above, the connection device according to the first embodiment of the present invention has projections 33a and 35a each having a generally convex shape on the inner side of the respective bridge portions 33 and 35. Accordingly, the surfaces of the slide member 38 come into sliding contact with the convex surfaces of the projections 33a and 35a, whereby the sliding friction is considerably decreased. Furthermore, even if the slide member 38 has any burrs on either longitudinal edge, the escape portions 33b and 35b liberate such burrs from being caught by the edges of the bridge portions 33 or 35. Therefore, even when the guide member does not follow a straight line path between the spaced electric components, the slide member 38 is always allowed to slide smoothly and easily.

Figure 4:
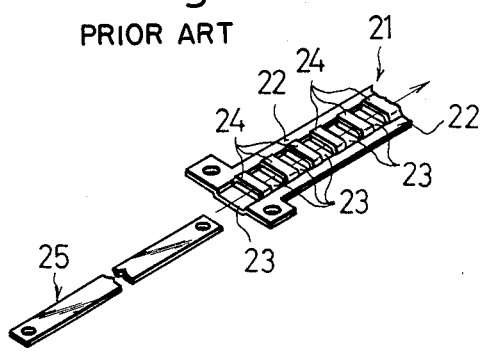
Figure 6:
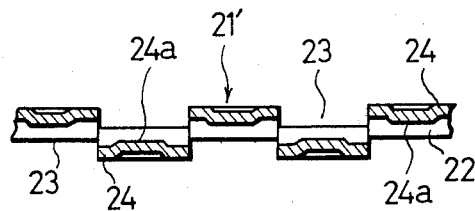
FIG. 6 shows a second embodiment according to the present invention, in which diagram (A) is a longitudinal cross-sectional view showing important portions of a guide member, and diagram (B) is a lateral cross-sectional view.
Figure 6:
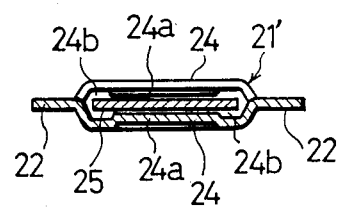

FIG. 6 is a diagram showing a second embodiment according to the present invention. The connection device according to the second embodiment is similar to the recently developed metallic connection fitting shown in FIG. 4, in regard to the materials used and the principal construction. Therefore, the same reference numerals are used to represent the same members as those of FIG. 4. Referring to FIG. 6, however, reference numeral 21' denotes a guide member, and a projection 24a having an upwardly protruded surface is formed on the inner surface of each of the bridge portions 24. Escape portions 24b and 24b are formed between the end portions of the sides of said projection and the respective longitudinal edge portions 22 of the guide member. In the case of the connection device of the second embodiment also, the slide member 25 can be smoothly and easily moved.

Figure 5:
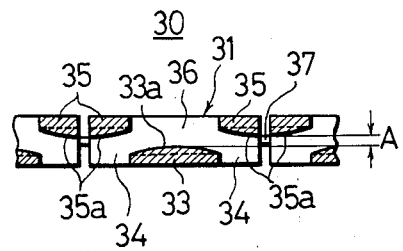
FIG. 5 shows a first embodiment of the present invention, in which diagram (A-1) is a top plan view showing important portions of one end of the device, diagram (A-2) is a bottom plan view showing important portions of the other end of the device, diagram (B) is a cross-sectional view, partly broken away, taken along line A—A' of diagram (A-1), and without a slide member, and diagram (C) is a cross-sectional view along line B—B' of diagram (A-1)
Figure 5:
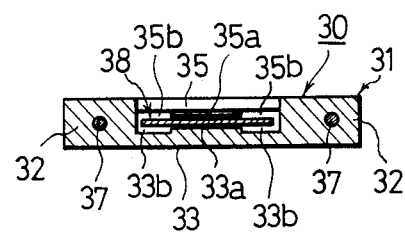

As mentioned in the foregoing, the connection device of the present invention has projections with convex surfaces on the inner side of bridge portions of the guide members, as well as escape portions formed between ends of the projections and longitudinal edge portions of the guide members, and therefore exhibits the following effects:

(1) The slide member can be always moved smoothly and easily when the connection device is used in a straight manner or even in a curved manner;

(2) The slide member can be easily inserted through the guide member; and (3) Since the clearance A shown in the diagram (B) of FIG. 5 can be brought very close to the thickness of the slide member, it is possible to minimize the feeding error that would otherwise be caused by the flexibility of the slide member.

What is claimed is:

1. A connection member for interconnecting spaced electric components for operating one component remotely by actuation of the other, comprising a guide member formed of a resilient material and defining a generally flat tubular pathway adapted to extend in either a curved or straight path between said components;

said pathway having windows and bridge portions extending laterally across said guide member with the windows on one surface facing the bridge portions of the other;

a slide member formed by cutting a plate of a resilient material to a predetermined width, said slide member being insertable through said guide member to ride on the inner surfaces of said bridge portions and having end portions adapted to be connected to respective ones of said components;

and means formed on the inner surface of said bridge portions for engaging slidably the central portion of said slide member while providing escape portions for the lateral edges thereof whereby any burrs formed during cutting of said slide member can pass through said escape portions even if said guide member is bent into a curved configuration, said means including projections extending inwardly of the respective bridge portions, said projections running along the bridge portions so as to extend transversely across said guide member and ending short of the sides of the guide member so as to form said escape portions; said projections each having a surface curved in the longitudinal direction of said guide member.

2. A connection member according to claim 1, said guide member being comprised of a plurality of guide elements interconnected by resilient wires extending through the lateral edge portions of said guide elements.

3. A connection member according to claim 2, said guide elements having a central window flanked by lateral bridge portions on one surface thereof, and a central bridge portion flanked by recessed portions opening outwardly on the other surface thereof, adjacent recessed portions forming a window.

4. A connection member according to claims 1, 2 or 3, said guide member and slide member being comprised of a synethetic resin material.

5. A connection member according to claim 1, said guide member being a unitary piece of resilient metal.

* * * * *